United States Patent [19]

Furuyama

[11] Patent Number: 4,818,608
[45] Date of Patent: Apr. 4, 1989

[54] MAGNETIC RECORDING MEDIUM

[75] Inventor: Shizuo Furuyama, Katano, Japan

[73] Assignee: Matsushita Electric Industrial Co., Ltd., Osaka, Japan

[21] Appl. No.: 13,445

[22] Filed: Feb. 10, 1987

[30] Foreign Application Priority Data

Feb. 10, 1986 [JP] Japan ................. 61-27119
Feb. 10, 1986 [JP] Japan ................. 61-27120
Feb. 10, 1986 [JP] Japan ................. 61-27121
Feb. 10, 1986 [JP] Japan ................. 61-27122
Feb. 10, 1986 [JP] Japan ................. 61-27123
Feb. 10, 1986 [JP] Japan ................. 61-27124
Feb. 10, 1986 [JP] Japan ................. 61-27126

[51] Int. Cl.$^4$ ............... G11B 5/70; G11B 5/708
[52] U.S. Cl. .................. 428/327; 428/328; 428/329; 428/694; 428/900
[58] Field of Search ........... 428/327, 694, 695, 328, 428/329, 900

[56] References Cited

U.S. PATENT DOCUMENTS

| | | | |
|---|---|---|---|
| 4,076,890 | 2/1978 | Yamada | 428/327 |
| 4,275,115 | 6/1981 | Naruse | 428/329 |
| 4,399,189 | 8/1983 | Nakashima | 428/328 |
| 4,423,452 | 12/1983 | Kajimoto | 428/694 |
| 4,460,651 | 7/1984 | Hosaka et al. | 428/694 |
| 4,537,833 | 8/1985 | Kasuga | 428/328 |
| 4,571,364 | 2/1986 | Kasuga | 428/900 |
| 4,579,778 | 4/1986 | Yamaguchi | 428/900 |
| 4,618,536 | 10/1986 | Morioka | 428/900 |
| 4,656,089 | 4/1987 | Ninomiya | 428/327 |

Primary Examiner—Paul J. Thibodeau
Attorney, Agent, or Firm—Wenderoth, Lind & Ponack

[57] ABSTRACT

A magnetic recording medium comprising a non-magnetic substrate and a magnetic layer which is formed on the substrate and comprises a magnetic powder and an abrasive material consisting of α-alumina particles as a first component and at least one second particulate component selected from the group consisting of SiC, $TiO_2$, TiC, α-$Fe_2O_3$, $Cr_2O_3$, fluorocarbon and benzoguanamine, which has good abrasion property and improved abrasion resistance.

8 Claims, No Drawings

MAGNETIC RECORDING MEDIUM

BACKGROUND OF THE INVENTION

1. Field of the Invention

The present invention relates to a magnetic recording medium. More particularly, it relates to a magnetic recording medium with improved abrasion resistance to be used as an audio tape, a video tape, a magnetic disc, a magnetic drum and the like.

2. Description of the Prior Arts

Recently, in order to improve electromagnetic characteristics of a magnetic recording medium, particularly a video tape, attempts have been made to decrease sliding noise caused by a ferrite head by imparting an adequate abrasion property to the magnetic recording medium. For example, U.S. Pat. No. 4,460,651 discloses particulate alumina as an effective abrasive material.

In order to reduce noise due to particles contained in a magnetic layer, a particle size of magnetic powder has been reduced in addition to well dispersing the magnetic powder in the magnetic layer. Recently, the magnetic powder has a BET specific surface area of about 60 $m^2/g$. With the great decrease of the particle size of the magnetic powder, the magnetic recording medium loses its abrasion property, this resuting in increase of sliding noise. In case of the magnetic recording medium, particularly the video type containing extremely fine magnetic powder, although a conventional abrasive material can impart an abrasion property to the magnetic recording medium, the strength of the magnetic layer containing such magnetic powder is not necessarily sufficient and its abrasion resistance is unsatisfactory.

SUMMARY OF THE INVENTION

One object of the present invention is to provide a magnetic recording medium having decreased sliding noise caused by ferrite head.

Another object of the present invention is to provide a magnetic recording medium having balanced abrasion property and abrasion resistance.

Further object of the present invention is to provide a magnetic recording medium having improved durability.

These and other objects of the present invention are accomplished by a magnetic recording medium comprising a non-magnetic substrate and a magnetic layer which is formed on the substrate and comprises a magnetic powder and an abrasive material consisting of $\alpha$-alumina particles as a first component and at least one second particulate component selected from the group consisting of SiC, $TiO_2$, TiC, $\alpha$-$Fe_2O_3$, $Cr_2O_3$, fluorocarbon and benzoguanamine.

DETAILED DESCRIPTION OF THE INVENTION

For the decrease of the sliding noise caused by the ferrite head, $\alpha$-alumina is found to be more effective than $Cr_2O_3$, SiC or $TiO_2$. To increase durability of the magnetic recording medium, it is essential to improve both abrasion property and abrasion resistance of the magnetic recording medium. However, $\alpha$-alumina cannot be an effective abrasive material for improving abrasion resistance of the magnetic recording medium although it can improve the abrasion property.

According to the study by the present inventor, it has been found that an abrasive material consisting of $\alpha$-alumina particles as a first component and at least one particulate component selected from the group consisting of SiC, $TiO_2$, TiC, $\alpha$-$Fe_2O_3$, $Cr_2O_3$, fluorocarbon and benzoguanamine greatly improves abrasion resistance and in turn durability of the magnetic recording medium. Preferably, fluorocarbons to be used according to the present invention are those solid at room temperature.

According to the present invention, preferably $\alpha$-alumina has an average particle size of not larger than 1 $\mu m$, more preferably from 0.1 to 0.5 $\mu m$.

SiC or fluorocarbon used according to the present invention has an average particle size of not larger than 1 $\mu m$, preferably 0.1 to 0.3 $\mu m$. $TiO_2$, TiC, $\alpha$-$Fe_2O_3$ $Cr_2O_3$ or benzoguanamine has an average particle size of not larger than 1 $\mu m$, preferably from 0.5 to 0.3 $\mu m$. When the average particle size of the abrasive material is too small, it is difficult to disperse the material in a magnetic paint. When it is larger than 1 $\mu m$, surface smoothness of the magnetic layer is worse and thus electromagnetic characteristics of the magnetic recording medium are deteriorated.

The amount of the second abrasive component is preferably from 2 to 30% by weight based on the weight of $\alpha$-alumina. When it is less than 2% by weight, the abrasion resistance is not effectively improved. When it is larger than 30% by weight, the volume ratio of the magnetic powder in the magnetic layer becomes so small that noise increases.

The total amount of the abrasive materials is from 2 to 10% by weight, preferably from 4 to 9% by weight based on the weight of the magnetic powder.

According to the present invention, the magnetic layer comprises a magnetic powder, a binder and the abrasive material as described in the above.

Any conventional ferromagnetic powder may be used at the magnetic powder according to the present invention. Preferred examples of the ferromagnetic powder used according to the present invention are $\gamma$-$Fe_2O_3$, cobalt-containing $\gamma$-$Fe_2O_3$, Fe, Fe-Co alloy, Fe-Ni alloy, Co-Ni alloy, Fe-Co-Ni alloy, Fe-Co-B alloy, Fe-Co-Cr-B alloy and the like.

As the binder, also any conventional one may be used. Preferred examples of the binder are polyurethane resin, hydrophilic group-containing polyurethane resin, nitrocellulose, hydrophilic group-containing nitrocellulose derivatives, polyester resin, polyvinyl chloride resin, vinyl chloride/vinyl acetate/vinyl alcohol copolymer, hydrophilic group-containing polyvinyl chloride derivatives, butyral resin, phenoxy resin and the like.

To increase the dispersibility of the magnetic layer components in a liquid medium, lecithin or a higher aliphatic carboxylic acid such as oleic acid and stearic acid can be used.

The magnetic layer may further contain, as an antistatic agent, electrically conductive carbon or graphite type carbon black.

The components of the magnetic layer are dispersed in a liquid medium such as ketones (e.g. methyl ethyl ketone, cyclohexanone, methyl isobutyl ketone, etc.), aromatic hydrocarbons (e.g. toluene, xylene, etc.) and mixtures thereof byy means of a mixing apparatus to prepare a magnetic paint composition. Examples of the suitable mixing apparatus are a three-roll mill, a pressure kneader, a high-speed stone mill, a Henschel mixer, a vibrating mill, a high-speed impeller dispersion mixer, a disper, a ball mill, a pebble mill, a sand grinder, an attriter, an agitator mill, a coball mill, a homogenizer, an ultrasonic dispersing apparatus and the like and a combination of at least two of them.

Usually, the magnetic paint is prepared as follows:

Firstly, the magnetic powder and the additives such as carbon, an abrasive material and a dispersing agent are dispersed together with the binder and a small amount of the solvent at a state of a high concentration of the solid components. Then, the remaining solvent is added to the above highly viscous dispersion so as to disperse the components uniformly. If desired, a hardner and/or a lubricating agent are added. Thus, the final magnetic paint with low viscosity is prepared.

The magnetic paint composition is applied on a substrate such as a polyester film and dried to form the magnetic layer by a conventional method.

PREFERRED EMBODIMENTS OF THE INVENTION

Practically and presently preferred embodiments of the present invention will be illustrated by following examples, in which part(s) are by weight.

EXAMPLE 1

Following components were mixed and dispersed by means of a kneader and a sand grinder for 5 hours to prepare a magnetic paint.

| Component | Parts |
| --- | --- |
| Ferromagnetic Co-coated iron oxide powder (BET specific surface: 43 m$^2$/g, Hc: 650 Oe, $\sigma_s$: 75 emu/g, Major axis: 0.25 μm, Minor axis: 0.05 μm) | 100 |
| Oleic acid | 1 |
| Polyurethane resin | 10 |
| Nitrocellulose | 10 |
| α-Alumina (average particle size: 0.3 μm) | 5 |
| Silicon carbide (average particle size: 0.2 μm) | 1 |
| Carbon black (S-170, trade name of Degussa) | 3 |
| Butyl stearate | 1 |
| MEK-toluene-cyclohexanone (2:2:1) | 200 |

To the magnetic paint, polyisocyanate (Coronate L, a trade name of Nippon Polyurethane) (4 parts) was added and filtered through a filter having an average pore size of 1 μm.

The resulting magnetic paint composition was applied on one surface of a polyethylene terephthalate film of 14 μm in thickness, orientated, dried and planished followed by curing. On the other surface of the film, a back coating comprised carbon black was coated to form a back coating layer. The film having the magnetic layer and the back coating was cut to a width of ½ inch to produce a magnetic tape.

COMPARATIVE EXAMPLE 1

In the same manner as in Example 1 but using no silicon carbide, a magnetic tape was produced.

COMPARATIVE EXAMPLE 2

In the same manner as in Example 1 but using 6 parts of α-alumina and no silicon carbide, a magnetic tape was produced.

EXAMPLE 2

In the same manner as in Example 1 but using an Fe-Co-Ni alloy having the following properties in place of the ferromagnetic iron oxide, a magnetic tape was produced.

| Fe—Co—Ni Alloy |
| --- |
| Composition: Fe:Co:Ni = 90:2:8 (weight ratio) |
| Hc: 1,500 Oe |
| BET specific surface area: 55 m$^2$/g |
| $\sigma_s$: 125 emu/g |
| Major axis: 0.20 μm |
| Minor axis: 0.03 μm |

COMPARATIVE EXAMPLE 3

In the same manner as in Example 2 but using no silicon carbide, a magnetic tape was produced.

COMPARATIVE EXAMPLE 4

In the same manner as in Example 2 but using 6 parts of α-alumina and no silicon carbide, a magnetic tape was produced.

EXAMPLE 3

Following components were mixed and dispersed by means of a Henschel mixer and a coball mill for 5 hours to prepare a magnetic paint.

| Component | Parts |
| --- | --- |
| Ferromagnetic metal iron powder (BET specific surface: 59 m$^2$/g, Hc: 1,560 Oe, $\sigma_s$: 127 emu/g, Major axis: 0.20 μm, Minor axis: 0.025 μm) | 100 |
| Lecithin | 1 |
| Sodium sulfonate group-containing polyurethane resin | 12 |
| Vinyl chloride/vinyl acetate/vinyl alcohol copolymer | 10 |
| α-Alumina (average particle size: 0.25 μm) | 7 |
| Silicon carbide (average particle size: 0.3 μm) | 2 |
| Graphite (average particle size: 0.5 μm) | 1 |
| Stearic acid | 1 |
| MEK-toluene-cyclohexanone (2:2:1) | 200 |

To the magnetic paint, polyisocyanate (Desmodur L, trade name of Bayer) (4 parts) was added and stirred with a disper followed by filtration through a filter having an average pore size of 1 μm.

The resulting magnetic paint composition was applied on a polyethylene terephthalate film of 10 μm in thickness, orientated, dried and planished followed by curing. On the other surface of the film, a back coating comprising carbon black was coated to form a back coating layer. The film having the magnetic layer and the back coating was cut to a width of ½ inch to produce a magnetic tape.

COMPARATIVE EXAMPLE 5

In the same manner as in Example 3 but using no silicon carbide, a magnetic tape was produced.

COMPARATIVE EXAMPLE 6

In the same manner as in Example 3 but using 9 parts of α-alumina and no silicon carbide, a magnetic tape was produced.

Each of the magnetic tapes produced in Examples and Comparative Examples was installed in a video cassette case and measured on C/N at 5 MHz.

For measuring the C/N of the magnetic tape, VHS video tape deck (NV-8800 manufactured by Matsushita Electric Industrial Co., Ltd.) was used. In the case of iron magnetic powder or alloy magnetic powder, the magnetic head was replaced with a Sendust alloy head. As a standard tape, National video tape, Super HG 120 (manufactured by Matsushita Electric Industrial Co., Ltd.) was used and its C/N was defined to be 0 (zero) dB.

The durability of the magnetic tape was evaluated by traveling the tape in the deck for 100 passes at 10° C., 10% RH and observing the surface condition of the tape. The abrasion resistance was evaluated by sliding a sheet of emery paper on the tape contacted onto a glass plate ten times at a rate of 0.2 m/sec. under load of 100 g and observing a degree of contamination of the emery paper. Surface roughness of the magnetic tape was measured by Talysurf (manufactured by Rank Talor Hobson) and expressed in terms Of arithmetic mean (Ra) of deviations of the surface roughness from the center line.

The results are shown in following Table.

TABLE

|  | Surface roughness (μm) | C/N (dB) | Abrasion resistance | Durability |
| --- | --- | --- | --- | --- |
| Example 1 | 0.013 | +0.7 | Substantially no deposition | No trouble |
| Comparative Example 1 | 0.013 | +0.7 | Deposition | Drop of powder Head clogging |
| Comparative Example 2 | 0.014 | +0.5 | Substantially no deposition | Head abrasion of 15 μm |
| Example 2 | 0.010 | +6.5 | ↑ | No trouble |
| Comparative Example 3 | 0.010 | +6.5 | Deposition | Drop of powder Head clogging |
| Comparative Example 4 | 0.011 | +6.0 | Substantially no deposition | Head abrasion of 13 μm |
| Example 3 | 0.009 | +7 | ↑ | No trouble |
| Comparative Example 5 | 0.009 | +7 | Deposition | Drop of powder Head clogging |
| Comparative Example 6 | 0.0095 | +6.5 | Substantially no deposition | Head abrasion of 10 μm |

As is apparent from the above results, the magnetic tapes of the present invention having a magnetic layer comprising α-alumina particles and silicon carbide particles have superior abrasion resistance and durability to the magnetic tapes having a magnetic layer comprising no silicon carbide. The addition of silicon carbide does not deteriorate the surface smoothness of the magnetic layer or does not decrease electromagnetic characteristics of the magnetic tape.

EXAMPLE 4

In the same manner as in Examples 1 to 3 but using $TiO_2$, TiC, $\alpha\text{-}Fe_2O_3$, $Cr_2O_3$, fluorocarbon or benzoguanamine in place of silicon carbide, a magnetic tape was produced. The fluorocarbon particles have an average particle size of 0.2 μm and other particles have an average particle size of 0.1 μm. The produced magnetic tapes have substantially the same surface roughness, C/N, abrasion resistance and durability as those obtained in Examples 1 to 3.

What is claimed is:

1. A magnetic recording medium comprising a nonmagnetic substrate and a magnetic layer which is formed on the substrate and comprises a magnetic powder, an abrasive material consisting of α-alumina particles having an average particle size of not larger than 1 μm as a first particulate component and at least one second particulate component as an abrasion reistance additive selected from the group consisting of SiC, $TiO_2$, TiC, $\alpha\text{-}Fe_2O_3$, $Cr_2O_3$, fluorocarbon and benzoguanamine, the second particulate component having an average particle size which is smaller than the first particulate component and contained in an amount of 2 to 30% by weight based on the weight of the first component α-alumina, and the total amount of said first and second particulate components being from 2 to 10% by weight based on the weight of the magnetic powder.

2. The magnetic recording medium according to claim 1, wherein the second component is SiC having an average particle size of 0.1 to 0.3 μm and the amount of SiC is 2 to 30% by weight based on the weight of α-alumina.

3. The magnetic recording medium according to claim 1, wherein the second component is $TiO_2$ having an average particle size of 0.05 to 0.3 μm and the amount of $TiO_2$ is 2 to 30% by weight based on the weight of α-alumina.

4. The magnetic recording medium according to claim 1, wherein the second component is TiC having an average particle size of 0.05 to 0.3 μm and the amount of TiC is 2 to 30% by weight based on the weight of α-alumina.

5. The magnetic recording medium according to claim 1, wherein the second component is $\alpha\text{-}Fe_2O_3$ having an average particle size of 0.05 to 0.3 μm and the amount of $\alpha\text{-}Fe_2O_3$ is 2 to 30% by weight based on the weight of α-alumina.

6. The magnetic recording medium according to claim 1, wherein the second component is $Cr_2O_3$ having an average particle size of 0.05 to 0.3 μm and the amount of $Cr_2O_3$ is 2 to 30% by weight based on the weight of α-alumina.

7. The magnetic recording medium according to claim 1, wherein the second component is fluorocarbon having an average particle size of 0.1 to 0.3 μm and the amount of the solid fluorocarbon is 2 to 30% by weight based on the weight of α-alumina.

8. The magnetic recording medium according to claim 1, wherein the second component is benzoguanamine having an average particle size of 0.05 to 0.3 μm and the amount of benzoguanamine is 2 to 30% by weight based on the weight of α-alumina.

* * * * *